United States Patent Office 3,173,916
Patented Mar. 16, 1965

3,173,916
DERIVATIVES OF 7-AMINOCEPHALOSPORANIC ACID
Gilbert M. Shull, Old Lyme, and Ben A. Sobin, Gales Ferry, Conn., assignors to Chas. Pfizer & Co., Inc., New York, N.Y., a corporation of Delaware
No Drawing. Filed June 28, 1960, Ser. No. 39,218
15 Claims. (Cl. 260—243)

This invention relates to new antibiotic compounds and their salts which are active against both gram-positive and gram-negative microorganisms and resistant to penicillinase.

Cephalosporin C, a valuable antibiotic having the Formula IA

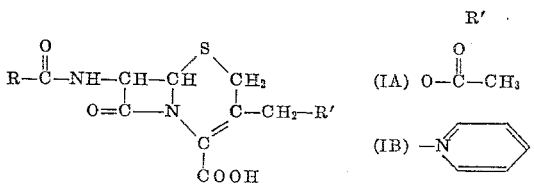

wherein R represents the D-4-amino-4-carboxy-n-butyl moiety is produced simultaneously with Cephalosporin N, a pencillin type compound also known as Synnematin B and (D-4-amino-4-carboxy-n-butyl)-penicillin, by a species of Cephalosporium. It resembles Cephalosporin N in many of its physical, biological and chemical properties. In many respects Cephalosporin C resembles the penicillins in general in that it is an N-acyl derivative of a β-lactam fused to a dihydrothiazine ring system in place of a fused β-lactamthiazolidine ring system. It reacts with weak heterocyclic tertiary bases, such as pyridine, to form a compound believed to have the Formula IB which exists as the Zwitter ion form and is known trivially as Cephalosporin $C_A$.

The N-acyl side chain can, by analogy to amide linkages in general and to the amide linkage of pencillins in particular, be cleaved by mild hydrolysis to produce the precursor compound. Hydrolysis of the acyl moiety in the penicillin series, for example, produces the penicillin nucleus or precursor 6-aminopenicillanic acid. Similarly, hydrolysis of the acyl group of Cephalosporin C produces the corresponding nucleus or precursor 7-aminocephalosporanic acid having Formula IIA:

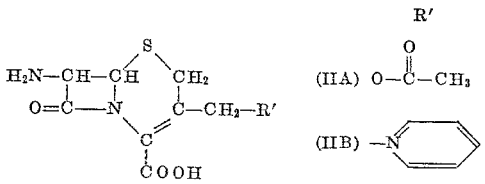

together with the lactone of the desacetyl derivative of Cephalosporin C, known as Cephalosporin $C_c$. Further hydrolysis of Cephalosporin $C_c$ removes the D-δ-amino-β-carboxyvaleryl side chain to give the lactone of the desacetyl derivative of 7-aminocephalosporanic acid having Formula III:

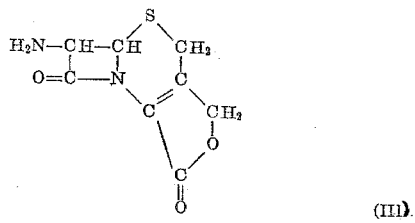

In the same manner, Cephalosporin $C_A$ is hydrolyzed to its corresponding nucleus or precursor having Formula IIB. As expected, the properties of Cephalosporin C, particularly the antibiotic properties, are dependent upon the overall structure of the compound. However, as in the penicillin series of compounds it is expected that the properties of a particular cephalosporin, as the N-acyl derivatives of 7-aminocephalosporanic acid will hereinafter be referred to, will depend upon the acyl group attached to the amino group of the precursor compounds of Formulae IIA and IIB.

The novel antibiotics of the present invention will be named for convenience by reference to the particular R group attached to the —CONH— group of the cephalosporanic acid nucleus. Thus, for example, the compound of Formula IA wherein R represents the D-4-amino-4-carboxy-n-butyl radical, known trivially as Cephalosporin C, is named (D-4-amino-4-carboxy-n-butyl)-cephalosphorin; the compound wherein R is the benzyl radical is named benzylcephalosporin. The cephalosporins derived from Formula IB which, when R is the D-4-amino-4-carboxy-n-butyl group is known as Cephalosporin $C_A$, will hereinafter be referred to as the Cephalosporin-A series. Thus, when R is benzyl, IIB is named benzylcephalosporin-A. In like manner, the Cephalosporins derived from Formula III will be referred to as the Cephalosporin lactones.

Of the many penicillins known, many are of poor acid stability and only a few are antagonistic toward both gram-positive and gram-negative microorganisms. Fewer still are resistant to penicillinase. Cephalosporin C, however, shows activity against both gram-positive and gram-negative microorganisms, is stable in the acid pH range and resistant to penicillinase. Despite the advantages of Cephalosporin C over the penicillins in general, however, the development of antibiotics having increased overall activity, or perhaps increased gram-negative activity, relative to that of Cephalosporin C is highly desirable.

There has now been discovered a series of novel and valuable cephalosporins, or N-acyl derivatives of cephalosporanic acid, which exhibit significant activity toward gram-negative and gram positive organisms and the penicillinase producing strains of staphylococci. The novel compounds of this invention have, in the acid form, the formulae illustrated by IA and IB above wherein R is selected from the group consisting of α- and β-halo substituted alkyl containing from 1 to 6 carbon atoms; α-phenyl-β-hydroxyethyl and α-substituted phenyl-β-hydroxyethyl wherein the substituent is selected from the group consisting of alkyl containing 1 to 4 carbon atoms, halogen, trifluoromethyl, alkoxy containing 1 to 4 carbon atoms, nitro, amino and hydroxyl; amino and substituted amino wherein the substituent is selected from the group consisting of alkyl containing 1 to 10 carbon atoms, phenyl, p-dimethylaminophenyl, nitrophenyl, p-carbomethoxyphenyl, p-chlorophenyl, p-methoxyphenyl and naphthyl; amino alkyl wherein the alkyl group is selected from the group consisting of phenyl substituted ethylene, and straight chain and branched chain alkylene radicals containing up to 8 carbon atoms and the N-carbobenzoxy derivatives thereof; α-allylmercaptoalkyl wherein alkyl is selected from the group consisting of alkyl containing 1 to 6 carbon atoms; cis- and trans-styrylmercaptomethyl, n-pentyl, 2-pentenyl, n-heptyl, phenylmercaptomethyl, p-hydroxybenzyl, α-phenylmercapto-β-hydroxyalkyl and α-phenoxy-β-hydroxyalkyl wherein the alkyl group contains from 2 to 5 carbon atoms, and the β-acyl derivatives thereof wherein the acyl group is selected from the group consisting of the acyl radicals of a hydrocarbon monocarboxylic acid containing 1 to 4 carbon atoms;

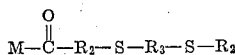

wherein M is selected from the group consisting of hydroxy, alkoxy containing 1 to 4 carbon atoms, amido, carboxymethylimido, and carboxyethylideneimido; $R_2$ is selected from the group consisting of methylene and ethylidene; $R_3$ is selected from the group consisting of cycloalkylene containing 4 to 6 carbon atoms, phenylene, 2,5-thienylene, 2-carboxy-3,4-thienylene, methylene and substituted methylene wherein the substituent is selected from the group consisting of carboxy, and halogen; alkylene containing 2 to 4 carbon atoms which may be unsaturated and substituted derivatives thereof wherein the substituent is selected from the group consisting of hydroxy, carboxy, halogen and alkanoyloxy radical of a hydrocarbon carboxylic acid containing 1 to 4 carbon atoms; and R' is selected from the group consisting of acetoxy and 1-pyridyl.

Included also in the present invention are the products derived from desacetyl-7-aminocephalosporanic acid lactone (III), and the physiologically acceptable salts of these products such as the sodium, potassium, calcium, ammonium and amine salts, all of which possess significant antibacterial activity.

The valuable products of this invention are remarkably effective in treating a number of susceptible gram-positive and gram-negative infections in animals including man. For this purpose, the pure materials or mixtures thereof with other antibiotics can be employed. They may be administered alone or in combination with a pharmaceutical carrier selected on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, for example, intramuscularly or subcutaneously. For parenteral administration they are best used in the form of a sterile aqueous solution which may contain other solutes, for example, enough saline or glucose to make the solution isotonic.

The novel and valuable products of this invention are prepared by acylation of the appropriate precursor compound (IIA, IIB or III) with a slight excess of the proper acid chloride, bromide or anhydride. The acid anhydrides, preferably the simple anhydrides, are advantageously used as acylating agents since their use not only simplifies isolation of the desired product but also avoids the presence of the strong anions, chloride and bromide, which accelerate or cause decomposition of the cephalosporin during isolation. However, when an acid halide is employed as acylating agent the strong anion, if desired, is removed by adsorption on a strong anion exchange resin. The acylation is conducted at a pH of from about 6.0 to about 8.0 and preferably at pH 7.0. The reaction system is buffered at the desired pH with, for example sodium bicarbonate, or dilute alkali is added as required throughout the reaction to maintain the desired pH level. The temperature may range from about 0° C. to about 50° C. but is preferably held at from about 0° C. to about 30° C.

The necessary acid chlorides, the side chain precursors, are prepared for the most part by methods known in the art. The α-phenyl-β-hydroxyalkanoic acids, for example, are prepared from the appropriately substituted acetophenones according to the procedure described by McKenzie et al., J. Chem. Soc 115, 830 (1919), which comprises: reacting the proper acetophenone derivative with hydrogen cyanide to produce the corresponding acetophenone cyanohydrin; hydrolyzing the cyanohydrin to the corresponding atrolactinic acid, followed by dehydration of the atrolactinic acid to the corresponding atropic acid. Treatment of the atropic acid derivative with hydrogen chloride produces the α-substituted phenyl-β-chloropropionic acid which is then hydrolyzed to the desired α-substituted phenyl-β-hydroxypropionic acid.

Alternatively, the desired α-substituted phenyl-β-hydroxypropionic acid is prepared from a suitably substituted phenyl acetic acid as described by Muller, Ber. 51, 252 (1918), and by Wislicenus et al., Ber. 51, 1237 (1918). This method comprises the condensation of a phenyl acetic acid ester with a formic ester in the presence of sodium ethylate followed by reduction of the formyl derivative thus produced to the corresponding hydroxy acid ester. The free acid is obtained by hydrolysis.

The cis- and trans-styrylmercaptoacetic acids are prepared via the condensation of phenylacetylene with thioglycolic acid and the mixture of cis- and trans-forms separated by means of their barium salts. The α-allylmercaptoalkanoic acids are obtained from the corresponding α-bromoalkanoic acids by reaction with allylmercaptan in the presence of an acid acceptor, or by reaction of the α-mercaptoalkanoic acid with allyl bromide under similar conditions.

The O,O - disubstituted chlorothionophosphates and phosphates are available via the reaction of the appropriate alcohol or phenol with thiono phosphoryl chloride or phosphoryl chloride.

The α-phenoxy-β-hydroxy-alkanoic acids are prepared by the acylation of an ester of phenoxyacetic acid, such as the ethyl ester, with ethylformate in the presence of sodium followed by reduction of the thus produced formyl ester to the β-hydroxyester. Replacement of ethyl formate by esters of alkanoic acids containing up to six carbon atoms produces the required α-phenoxy-β-hydroxy alkanoic acids. The α-phenylmercapto-β-hydroxy-alkanoic acids are prepared in the same manner from α-phenyl mercaptoacetic acid esters. Acylation of the β-hydroxy acids or esters with the appropriate acylating agent produces the corresponding β-alkanoxyloxy derivatives.

The required starting acids of formula

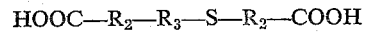

are obtained by the condensation of the thio acid,

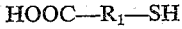

such as thioglycolic acid, with the dichloro or dibromo derivative of the $R_2$ moiety, for example methylene bromide, in the presence of an alkalizing agent, such as sodium hydroxide or potassium hydroxide. A modified procedure which is also applicable involves the condensation of the cuprous salt of the thio acid,

with the dihalo substituted $R_2$ moiety. This method is useful for preparing those acids wherein $R_2$ is phenylene.

When the two sulfur atoms are bridged by a single carbon atom, i.e., methylene, ethylidene, carboxymethylene, the compounds can, in many cases, be prepared from the corresponding formyl derivative, such as formaldehyde, acetaldehyde, glyoxylic acid, and the appropriate mercaptan, for example, thioglycolic acid, according to conventional procedures.

The starting acids thus obtained are converted to the monofunctional derivatives

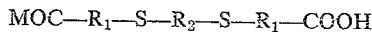
$$MOC-R_1-S-R_2-S-R_1-COOH$$

by conventional methods, such as by reaction of the respective anhydride, prepared by self-condensation of the acid by 1,3-dicyclohexylcarbodiimide, with the appropriate M—H reactant, i.e., methanol, ammonia, glycine. The acid anhydrides, chlorides and bromides are prepared according to conventional methods.

The acid chlorides of the acids are prepared by reacting the desired acid with thionyl chloride according to conventional procedures.

When using the precursor acid IIB as starting material a buffer system employing an organic base, such as pyridine-acetate, can be used. The use of such a buffer system with 7-cephalosporanic acid or the lactone of its desacetyl derivative brings about their partial transformation to the Cephalosporin $C_A$ type compound (IB).

Those compounds of this invention wherein R represents the amino or substituted amino group as defined above are best prepared by condensation of 7-aminocephalosporanic acid with the appropriate alkali metal cyanate or isocyanate compound, for example, sodium, potassium or ammonium cyanate, and alkyl and aryl isocyanates.

In the preparation of the aminoalkylcephalosporins, it is desirable, in order to minimize side reactions and thus obtain optimum yields, to protect or mask the amino group of the amino acid. The carbobenzoxy group is the preferred protecting group since it is readily removed under mild conditions to regenerate the free amino group. Other protecting groups, for example, the triphenylmethyl or "trityl" group, is also operative in the preparation of these novel penicillins. However, triphenylmethyl chloride is less readily available then carbobenzoxy chloride and the "trityl" group is somewhat more difficult to remove.

The required precursor compounds (Formulae IIA and IIB) are obtained by mild acid hydrolysis of Cephalosporin C and Cephalosporin $C_A$, respectively. The precursor IIB can also be obtained by treatment of 7-aminocephalosporanic acid with pyridine. The precursor compounds thus produced possess the same steric structure as the corresponding moieties of Cephalosporins C and $C_A$.

More specifically, the precursor compounds, 7-aminocephalosporanic acid and its desacetyl lactone (IIA and III) are produced from Cephalosporin C by treating Cephalosporin C with an aqueous solution of a dilute mineral acid, for example hydrochloric acid of from about 0.01 to about 1.0 molarity and a temperature of from about 0° to about 50° C. for a period of from several hours to several days. The period of hydrolysis depends, of course, upon the concentration of acid used and the temperature. When using 0.1 M HCl at room temperature, a period of 3 to 4 days generally effects substantially complete hydrolysis. Alternatively, the hydrolysis can be accomplished by means of a strong cation exchange resin (H+ cycle). Similarly, hydrolysis of Cephalosporin $C_A$ produces the precursor IIB. The products are isolated by electrophoretic or chromatographic techniques and acylated to the desired cephalosporin.

The precursor compounds, however, need not be isolated but can be acylated directly to the desired cephalosporin which is then separated by appropriate methods, for example, chromatographic or electrophoretic techniques.

In addition, the desacetyl-7-aminocephalosporanic acid lactone can be reacted with hydrocarbon carboxylic acids or salts thereof to produce the corresponding hydroxy ester. For example, sodium acetate reacts with the lactone to regenerate 7-aminocephalosporanic acid. In this manner, a variety of homologs of 7-aminocephalosporanic acid of Formula IIA wherein the R' moiety represents an alkanoxyloxy moiety derived from a hydrocarbon carboxylic acid containing up to six or more carbon atoms are prepared. The homologs can in turn be acylated at the 7-amino group to produce novel isotelic antibiotics having use in the treatment of a variety of bacterial infections in animals and man.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

By virtue of the asymmetric center present in the side chain many of the novel compounds of this invention can exist in diastereoisomeric forms, and mixtures thereof, derived respectively from the isomeric precursor acids. The preparation of the various modifications is most conveniently and preferably accomplished by reacting the 7-aminocephalosporanic acid with the appropriate modification, that is, with the dl- or the d- or the l-component of the acid chloride.

7-AMINOCEPHALOSPORANIC ACID

Procedure A

A solution of 1 part (by weight) Cephalosporin C sodium salt in 15 parts (by weight) water is adjusted to pH 2.5 by the addition of Dowex 50 x8, hydrogen form (a nuclear sulfonated polystyrene resin crosslinked with divinylbenzene and described in U.S. Patents 2,366,077 and 2,518,420, available from the Dow Chemical Co.). The resin is removed by filtration and washed with 5 parts (by weight) water. N-HCl, 5 ml. per part of Cephalosporin C sodium salt, is added to the combined filtrate and washings and the solution kept at room temperature for 3 days then passed through a column of 25 ml. of Dowex-1, acetate form (a polystyrene product cross linked with divinylbenzene and containing functional quaternary ammonium groups; available from the Dow Chemical Co.). The column is washed with 150 ml. of water followed by 300 ml. of 0.5 N acetic acid. The eluate collected from the water wash, on concentration in vacuo yields Cephalosporin $C_c$. The acetic acid eluate is freeze dried to give 7-aminocephalosporanic acid and other products of the mild acid degradation; notably Cephalosporin $C_c$ and unchanged Cephalosporin C.

It must be pointed out that when using 7-aminocephalosporanic acid, prepared as described above, in the following examples, the Cephalosporin C and Cephalosporin $C_c$ present are also converted to their N-acyl derivatives. The product actually obtained is, in each case, a mixture of these products in which the acylated cephalosporin predominates.

In like manner, Cephalosporin $C_c$ and Cephalosporin $C_A$ are hydrolyzed to their respective precursors, III and IIB. The products are separated by electrophoresis.

Example I

To a solution of 7-aminocephalosporanic acid (prepared as described in Procedure A), neutralized and buffered at pH 7.0 with a 1:2 solution of acetone-3% aqueous sodium bicarbonate, there is gradually added a 10% excess of β-bromopropionyl chloride (based on the Cephalosporin C used) in acetone. The temperature is maintained at 0°–5° C. throughout the reaction. After one hour, the mixture is extracted with an equal volume of ether and the ether layer discarded. The aqueous layer is adjusted to pH 2.0 with aqueous phosphoric acid and the solution extracted twice with an equal volume of n-butylacetate. The combined n-butyl acetate extracts are washed with 1/10 volume of water, then extracted with one-half volume of water, sufficient aqueous KOH being added to bring the pH to 5.0. The aqueous extract is freeze dried to give a mixture of the potassium salts of β-bromoethylcephalosporin, β-bromoethylcephalosporin $C_c$ and β-bromoethyl Cephalosporin C. Paper chromatography in n-butanol:ethanol:water (4:1:5 by volume) shows β-bromoethylcephalosporin to be the major component. The activity of the products is determined by placing the paper chromatogram in contact with S. aureus seeded plates.

The following cephalosporins are prepared by this procedure utilizing the appropriate acid chloride in place of β-bromopropionyl chloride. For convenience only the R group is listed. In each instance, the corresponding acyl derivatives of Cephalosporin C and Cephalosporin $C_c$ are also produced.

(R)
Bromomethyl
Chloromethyl
α-Chloroethyl
β-Chloroethyl
α-Bromopropyl
α-Bromoisopropyl
β-Bromopropyl
α-Bromobutyl
β-Bromobutyl
β-Chlorobutyl
α-Iodobutyl α-(o-Tolyl)-β-hydroxyethyl
α-(m-Tolyl)-β-hydroxyethyl
α-(p-Tolyl)-β-hydroxyethyl
α-(o-Ethylphenyl)-β-hydroxyethyl
α-(m-Ethylphenyl)-β-hydroxyethyl
α-(p-Ethylphenyl)-β-hydroxyethyl
α-(p-n-Butylphenyl)-β-hydroxyethyl
α-(p-Isobutylphenyl)-β-hydroxyethyl
α-(o-Bromophenyl)-β-hydroxyethyl
α-(m-Bromophenyl)-β-hydroxyethyl
α-(p-Bromophenyl)-β-hydroxyethyl
α-(m-Chlorophenyl)-β-hydroxyethyl
α-(p-Chlorophenyl)-β-hydroxyethyl
α-(p-Methoxyphenyl)-β-hydroxyethyl
α-(o-Nitrophenyl)-β-hydroxyethyl
α-(p-Nitrophenyl)-β-hydroxyethyl
α-(o-Butylphenyl)-β-hydroxyethyl
α-(m-Methoxyphenyl)-β-hydroxyethyl
α-(o-Chlorophenyl)-β-hydroxyethyl
α-(p-Fluorophenyl)-β-hydroxyethyl
α-(m-trifluoromethylphenyl)-β-hydroxyethyl
α-(o-Hydroxyphenyl)-β-hydroxyethyl
α-(m-Hydroxyphenyl)-β-hydroxyethyl
α-(p-Hydroxyphenyl)-β-hydroxyethyl
α-(p-Ethoxyphenyl)-β-hydroxyethyl
α-(o-Butoxyphenyl)-β-hydroxyethyl
α-(m-Propoxyphenyl)-β-hydroxyethyl α-Bromoamyl
α-Chloroamyl
β-Bromoamyl
α-Bromohexyl
α-Chlorohexyl
β-Bromohexyl
β-Chlorohexyl
α-Bromoisoamyl
α-Chloroisoamyl
Iodomethyl
α-Iodoethyl
β-Iodoethyl α-(p-Iodophenyl)-β-hydroxyethyl
α-(p-Propylphenyl)-β-hydroxyethyl
ω-Carbobenzoxyaminopentyl
β-Carbobenzoxyaminoethyl
γ-Carbobenzoxyaminopropyl
γ-Carbobenzoxyaminobutyl
γ-Carbobenzoxyamino-β-methylpropyl
γ-Carbobenzoxyamino-n-pentyl-
  carbobenzoxyaminobutyl
ω-Carbobenzoxyaminohexyl
β-Carbobenzoxyamino-n-pentyl
β-Carbobenzoxyamino-α-methylethyl
β-Carbobenzoxyamino-β-ethylbutyl-
  carbobenzoxyamino-n-heptyl
ω-Carbobenzoxyaminoheptyl
ε-Carbobobenzoxyamino-γ,γ-dimethylhexyl
ω-Carbobenzoxyaminooctyl
β-Carbobenzoxyamino-α-phenylethyl
β-Carbobenzoxyamino-β-phenylethyl Allylmercaptomethyl
α-Allylmercaptoethyl
α-Allylmercapto-n-propyl
α-Allylmercapto-n-butyl
α-Allylmercapto-n-pentyl
α-Allylmercapto-n-hexyl
α-Allylmercapto-γ-methylbutyl
α-Allylmercapto-β-methylpropyl
Cis-styrylmercaptomethyl
Trans-styrylmercaptomethyl
Pentyl
2-pentenyl
Heptyl
Phenylmercaptomethyl
p-Hydroxybenzyl

*Example II*

POTASSIUM AMINOCEPHALOSPORIN

A neutral aqueous solution of potassium cyanate (0.2 M) is added to a solution of 7-aminocephalosporanic acid prepared as described in Procedure A, from 2 g. of Cephalosporin C. Equimolar quantities of reactants are used based on the Cephalosporin C used. The reaction mixture is stirred for one hour then adjusted to pH 7.0 with dilute potassium hydroxide and freeze dried. The residue consists predominantly of the potassium salt of the carbamyl derivative of 7-aminocephalosporanic acid, referred to herein as aminocephalosporin potassium salt. Smaller quantities of the carbamyl derivatives of Cephalosporin C and Cephalosporin $C_c$ are also formed.

Alternatively, the products are isolated by adding the reaction mixture dropwise to a large excess of isopropyl alcohol. After chilling for 2 hours, the products are recovered by filtration.

*Example III*

A solution of 7-aminocephalosporanic acid, prepared according to Procedure A above from 2 grams of Cephalosporin C, is freeze-dried. The residue is suspended in acetonitrile at room temperature and 2 equivalents (based on the Cephalosporin C used) of triethylamine added. The mixture is stirred for 20 minutes at the end of which time it is a clear solution. A 2% excess of phenylisocyanate is added and the mixture thoroughly stirred for 2–3 hours. The product, recovered by filtration, consists predominantly of the triethylamine salt of anilinopenicillin.

In like manner the following N-aminocephalosporins are produced from the appropriate isocyanate. In cases wherein precipitation does not occur readily, the reaction mixture is concentrated in vacuo to about ⅓ volume and a large volume of ether added. The product is recovered by filtration or decantation. The following N-substituted aminocephalosporins are thus prepared: (only the R side chains are listed):

(R)
Ethylamino
m-Propylamino
n-Butylamino
Naphthylamino
t-Butylamino
n-Amylamino
Isocaprylamino
n-Hexylamino
n-Heptylamino
n-Decylamino
Methylamino
(o-Nitrophenyl)amino
(m-Nitrophenyl)amino
(p-Nitrophenyl)amino
(p-Methoxyphenyl)amino
(p-Dimethylaminophenyl)amino
(p-Carbomethoxyphenyl)amino
(p-Ethoxyphenyl)amino
(p-Chlorophenyl)amino

*Example IV*

The following cephalosporins are prepared as their potassium salts by the procedure of Example I using the appropriate acid chloride. For convenience, only the R groups are listed:

(R)
α-Phenoxy-β-hydroxyethyl
α-Phenoxy-β-hydroxy-n-propyl
α-Phenoxy-β-hydroxy-n-butyl
α-Phenoxy-β-hydroxy-n-pentyl
α-Phenoxy-β-hydroxy-n-hexyl
α-Phenoxy-β-hydroxy-n-heptyl
α-Phenoxy-β-hydroxy-δ-methylpentyl
α-Phenoxy-β-hydroxy-β-methylhexyl
α-Phenoxy-β-hydroxy-δ,δ-dimethylpentyl
α-Phenylmercapto-β-hydroxyethyl
α-Phenylmercapto-β-hydroxy-n-propyl
α-Phenylmercapto-β-hydroxy-n-butyl
α-Phenylmercapto-β-hydroxy-n-pentyl
α-Phenylmercapto-β-hydroxy-n-hexyl
α-Phenylmercapto-β-hydroxy-n-heptyl
α-Phenylmercapto-β-hydroxy-δ-methylpentyl
α-Phenylmercapto-β-hydroxy-α-methylbutyl

*Example V*

The α-phenoxy-β-hydroxyalkanoic acids used as reactants in the preceding example are converted to their acyl derivatives by refluxing with an excess of the desired acid chloride for one-half hour. The excess acid chloride is then removed by distillation under reduced pressure. Thionyl chloride is added (a slight excess), the mixture refluxed for one hour then distilled in vacuo to remove the excess thionyl chloride. The residue is reacted with 7-aminocephalosporanic acid as in Example I to give the acyl derivatives of the products of the preceding example. In this manner, the formyl, acetyl, propionyl and butyryl derivatives of the products of Example IV are obtained.

*Example VI*

Utilizing the procedure of Example I, but replacing β-bromopropionyl chloride by the proper O,O-disubstituted chloro thionophosphate or O,O-disubstituted chlorophosphate, the following cephalosporins, together with the corresponding N-acylated derivatives of Cephalosporin C and Cephalosporin $C_c$, are prepared. The R—C=O group is replaced by

For convenience only the $R_1$ and X values are listed. The listing of two values for X for a given value of $R_1$ indicates that both the phosphoryl and thionophosphoryl analogs are prepared.

| $R_1$ | X | $R_1$ | X |
|---|---|---|---|
| Methyl | S, O | p-Chlorophenyl | S, O |
| Ethyl | S, O | o-Bromophenyl | S, O |
| Isopropyl | S | o-Nitrophenyl | S, O |
| Phenyl | S, O | m-Nitrophenyl | S |
| n-Butyl | S | p-Nitrophenyl | S, O |
| β-Methylpropyl | S, O | o-Methoxyphenyl | S, O |
| β-Methoxyethyl | S, O | p-Methoxyphenyl | S, O |
| β-Chloroethyl | S, O | o-Ethoxyphenyl | S |
| o-Tolyl | S, O | p-Propoxyphenyl | S, O |
| m-Tolyl | S | Benzyl | S, O |
| p-Tolyl | S, O | α-Methylbenzyl | S, O |
| m-Ethylphenyl | S, O | p-t-Butylphenyl | S, O |
| p-Butoxyphenyl | S, O | o-Chlorobenzyl | S, O |
| p-Chlorobenzyl | S, O | m-Methoxybenzyl | S, O |
| o-Bromobenzyl | S, O | p-Nitrobenzyl | S, O |
| m-Methylbenzyl | S | p-n-Butylbenzyl | S, O |
| o-Propoxybenzyl | S | o-Propylphenyl | S, O |
| p-Isopropylphenyl | S | Ethylmercaptoethyl | S, O |
| Butylmercaptomethyl | S, O | β-Phenylmercaptoethyl | S |
| β-Phenylmercaptobutyl | S, O | n-Butoxyethyl | S |
| β-Methoxyheptyl | S, O | n-Propoxyamyl | S |
| Methylmercaptoheptyl | S | n-Propylmercaptoamyl | S |
| β-Phenoxy-n-hexyl | S, O | 2-Phenoxy-n-butyl | S, O |
| ω-Ethoxy-n-hexyl | S | β-Nitroethyl | S, O |
| ω-Nitro-n-butyl | S, O | ω-Nitro-n-hexyl | S |
| ω-Nitro-n-heptyl | S, O | ω-Chloro-n-heptyl | S, O |
| β-Bromopropyl | S | m-Nitrophenyl | S |
| o-Nitrobenzyl | S, O | p-t-Butylbenzyl | S, O |
| β-Phenylethyl | S, O | ω-Phenylbutyl | S |
| β-Phenylbutyl | S | n-Pentyl | S |
| n-Hexyl | S | n-Heptyl | S, O |
| γ-Methylbutyl | S | ε-Methylpentyl | S, O |
| Propyl | S | β-Chloropropyl | S |
| β-Methoxypropyl | S | Allyl | S, O |
| Cyclohexyl | S, O | Cyclopentyl | S, O |
| β-Bromoethyl | S | ω-Bromo-n-butyl | S |
| ω-Chloro-n-hexyl | S, O | β-Ethoxyethyl | S, O |
| β-Nitropropyl | S | α-Nitromethylbutyl | S |
| α,γ-Dimethylbutyl | S, O | di-n-Propylmethyl | S |
| Phenoxymethyl | S, O | β-Phenoxypropyl | S |
| Methylmercaptomethyl | S | Phenylmercaptomethyl | S, O |
| β-Phenoxybutyl | S | | |

Example VII

Carboxymethylmercaptomethylmercaptomethylcephalosporin is prepared by the procedure of Example I by the condensation of the acid chloride of methylene-bis-thioglycolic acid with 7-aminocephalosporanic acid.

Similarly additional related cephalosporins wherein the R group is

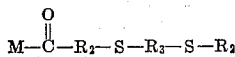

are prepared employing suitable acid chlorides. Only the $R_2$ and $R_3$ values are listed, for convenience; M is hydroxyl.

| $R_1$ | $R_3$ |
|---|---|
| $-CH_2-$ | $-CH_2-CH_2-$ |
| $-CH_2-$ | $-CH_2-CH_2-CH_2-$ |
| $-CH_2-$ | $-CH_2-CH_2-CH_2-CH_2-$ |
| $-CH_2-$ | $-CH(CH_3)-CH(CH_3)-$ |
| $-CH_2-$ | $-CH=CH-$ |
| $-CH_2-$ | Trans-⟨S⟩ |
| $-CH_2-$ | $CH_3-CH=$ |
| $-CH_3-CH=$ | $-CH_2-$ |
| $CH_3-CH=$ | $CH_3-CH=$ |
| $-CH_2-$ | $(CH_3-CH=)C=$ |
| $-CH_2-$ | $-CH(CH_3)-CH_2*$ |
| $-CH_2-$ | $(CH_3)_2-C=$ |
| $-CH_2-$ | $-C(CH_3)=CH*-$ |
| $-CH_2-$ | $-CH-CH_2*$ <br> $\parallel$ <br> $CH$ |
| $-CH_2-$ | $-CH_2-CH=CH-CH_2-$ |
| $-CH_2-$ | $-CH_2-CH(CH_3OH)-*$ |
| $CH_3-CH=$ | -⟨S⟩ |
| $-CH_2-$ | $-CH(CH_2Cl)-$ |
| $-CH_2-$ | $CH_3-CH_2-CH_2-CH=$ |
| $CH_3-CH=$ | $-CH_2-CHOH-CH_2-$ |
| $-CH_2-$ | $-CH_2-CHOH-CH_2-$ |
| $CH_3-CH=$ | $-CH_2-CH_2-CH_2-$ |
| $-CH_2-$ | -⟨S⟩- |
| $-CH_2-$ | $CH_2-CH(OH)-CH_2-CH_2-*$ |
| $-CH_2-$ | $-CH_2-CHI-CH_2-$ |
| $CH_3-CH=$ | $-CH=CH-$ |

| $R_3$ | $R_4$ |
|---|---|
| $-CH_2-CHOR_4-CH_2-$ | $CH_3-\overset{O}{\underset{\parallel}{C}}-$ |
| $-CH_2-CHOR_4-CH_2-$ | $CH_3-CH_2-\overset{O}{\underset{\parallel}{C}}-$ |
| $-CH_2-CHOR_4-CH_2-$ | $CH_3-CH_2-CH_2-\overset{O}{\underset{\parallel}{C}}-$ |
| $-CH_2-CH(CH_2OR_4)-$ | $CH_3-\overset{O}{\underset{\parallel}{C}}-$ |
| $-CH_2-CH(OH)-CH_2-CH_2-$ | $CH_3-\overset{O}{\underset{\parallel}{C}}-$ |
| $-CH_2-CH(OH)-CH_2-CH_2-$ | $CH_3-CH_2-\overset{O}{\underset{\parallel}{C}}-$ |
| $-CH_2-CHOR_4-CH_2-$ | $CH_3-\overset{O}{\underset{\parallel}{C}}-$ |
| $-CH_2-$ | $-CH(COOH)-$ |
| $-CH_3-CH=$ | $-CH(CH_3)-CH_2-*$ |

Utilization of the monoamides, the monocarboxymethyl and monocarboxyethylidene substituted amides, and the monoesters of the monoacid chlorides corresponding to the R groups of the cephalosporins listed above, produces the value of M is amido, carboxymethylimido, carboxyethylideneimido and alkoxy containing 1 to 4 carbon atoms.

Example VIII

The procedure of Example I is repeated using ω-carbobenzoxyaminocaproic acid chloride as the acylating agent to give ω-carbobenzoxyaminopentylcephalosporin potassium salt.

The following compounds are prepared in like manner from the proper acid chloride (only the R groups are reported)

(R)
β-Carbobenzoxyaminoethyl
γ-Carbobenzoxyaminobutyl
γ-Carbobenzoxyamino-n-pentyl
ω-Carbobenzoxyaminohexyl
β-Carbobenzoxyamino-α-methylethyl
δ-Carbobenzoxyamino-n-heptyl
ε-Carbobenzoxyamino-γ,γ-dimethylhexyl
β-Carbobenzoxyamino-α-phenylethyl
γ-Carbobenzoxyaminopropyl
γ-Carbobenzoxyamino-β-methylpropyl
δ-Carbobenzoxyaminobutyl
β-Carbobenzoxyamino-n-pentyl
β-Carbobenzoxyamino-β-ethylbutyl
ω-Carbobenzoxyaminoheptyl
ω-Carbobenzoxyaminooctyl
β-Carbobenzoxyamino-β-phenylethyl

Example IX

A solution of ω-carbobenzoxyaminopentylcephalosporin potassium salt is acidified to pH 2.5 with aqueous phosphoric acid and extracted with two one-half volumes of n-butanol. The n-butanol extracts are combined and washed with water.

The n-butanol solution is then added to a hydrogenation flask containing an equal volume of water, 0.5 g. of palladium black (100%) and the system stirred under hydrogen until evolution of carbon dioxide no longer occurs. The reaction mixture is then filtered and the filter cake washed with n-butanol and water. To the combined filtrate and washings there is added one-half volume of water-n-butanol (2:1), the mixture thoroughly agitated and the layers separated. The aqueous layer is then freeze dried to give ω-aminopentylpenicillin.

Hydrogenolysis of the remaining products of Example VII produces the corresponding aminoalkylcephalosporins having the R group.

(R)
β-Aminoethyl
γ-Aminopropyl
γ-Aminobutyl
γ-Amino-β-methylpropyl
γ-Amino-n-pentyl
δ-Aminobutyl
ω-Aminohexyl
β-Amino-n-pentyl
β-Amino-α-methylethyl
β-Amino-β-ethylbutyl
δ-Amino-n-heptyl
ω-Aminoheptyl
ε-Amino-γ,γ-dimethylhexyl
ω-Aminooctyl
β-Amino-α-phenylethyl
β-Amino-β-phenylethyl

Example X

The Cephalosporin $C_A$ products corresponding to the above cephalosporins are produced by substituting the precursor of Cephalosporin $C_A$ for 7-amino-cephalosporanic acid in the preceding examples.

Example XI

The products of the preceding examples are converted to their free acid forms by neutralization of the aqueous solutions of their potassium salts with 6 N hydrochloric acid to pH 2.2. The acids are recovered by extraction into methylisobutylketone followed by evaporation of the solvent.

Example XII

The free acids of Example VIII are transformed to their sodium, calcium, ammonium, procaine, N,N'-dibenzylethylenediamine, dibenzylamine, 1-ephenamine, N-benzyl-β-phenethylamine, and benzhydrylamine salts by reaction of aqueous solutions thereof with one equivalent of the appropriate base. The salts are recovered by freeze drying.

What is claimed is:

1. The compound having the formula

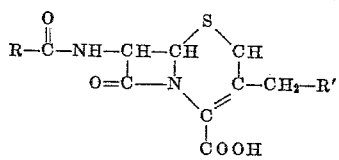

wherein R' is acetoxy and R is chloro-, bromo- and iodo-substituted alkyl having from 1 up to 6 carbon atoms.

2. The compound having the formula

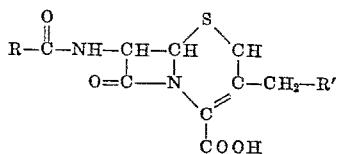

wherein R' is acetoxy and R is α-phenyl-β-hydroxyalkyl having up to 5 carbon atoms in the alkyl group.

3. The compound having the formula

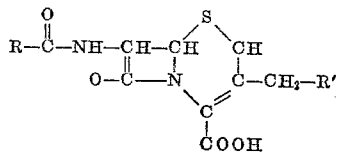

wherein R' is acetoxy and R is α-phenoxy-β-hydroxyalkyl having from 2 up to 5 carbon atoms in the alkyl group.

4. The compound having the formula

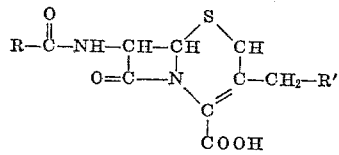

wherein R' is acetoxy and R is α-phenoxy-β-acetoxyalkyl having from 2 up to 5 carbon atoms in the alkyl group.

5. The compound having the formula

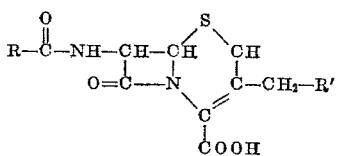

wherein R' is acetoxy and R is aminoalkyl having from 1 up to 8 carbon atoms.

6. The compound having the formula

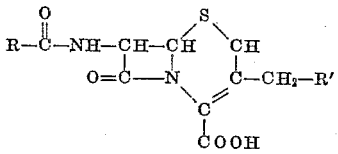

wherein R' is acetoxy and R is α-allylmercaptoalkyl having up to 6 carbon atoms in the alkyl group.

7. The compound having the formula

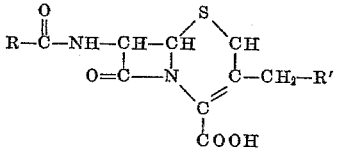

wherein R' is acetoxy and R is alkyl substituted amino having from 1 up to 10 carbon atoms.

8. The compound having the formula

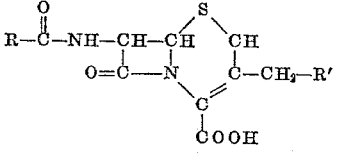

wherein R' is 1-pyridyl and R is chloro-, bromo- and iodo-substituted alkyl having from 1 up to 6 carbon atoms.

9. β-Bromoethylcephalosporin.
10. α-Phenoxy-β-acetoxyethylcephalosporin.
11. ω-Aminopentylcephalosporin.
12. Carboxymethylmercaptomethylmercaptomethylcephalosporin.
13. Aminocephalosporin.
14. O,O-diethylthionophosphorylcephalosporin.
15. α-Phenoxy-β-hydroxyethylcephalosporin.

References Cited by the Examiner

UNITED STATES PATENTS 2,941,995   6/60   Doyle et al. _____ 260—239.1

OTHER REFERENCES

Burger: Medicinal Chemistry, pages 36–48 (1960).
Journal American Medical Assoc., page 466, May 24, 1958.

NICHOLAS S. RIZZO, *Primary Examiner.*

I. MARCUS, WALTER A. MODANCE, *Examiners.*

UNITED STATES PATENT OFFICE
CERTIFICATE OF CORRECTION

Patent No. 3,173,916                               March 16, 1965

Gilbert M. Shull et al.

It is hereby certified that error appears in the above numbered patent requiring correction and that the said Letters Patent should read as corrected below.

Column 1, line 65, for "$\beta$-carboxyvaleryl" read -- $\delta$-carboxyvaleryl --; column 11, Example VII, in the table, heading to the first column, for "$R_1$" read -- $R_2$ --.

Signed and sealed this 24th day of August 1965.

(SEAL)
Attest:

ERNEST W. SWIDER                              EDWARD J. BRENNER
Attesting Officer                                   Commissioner of Patents